(12) United States Patent
Lee

(10) Patent No.: US 11,105,394 B2
(45) Date of Patent: Aug. 31, 2021

(54) REDUCER OF ELECTRIC POWER STEERING APPARATUS

(71) Applicant: MANDO CORPORATION, Pyeongtaek-si (KR)

(72) Inventor: Kyung Tack Lee, Suwon-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 202 days.

(21) Appl. No.: 16/567,448

(22) Filed: Sep. 11, 2019

(65) Prior Publication Data
US 2020/0086909 A1 Mar. 19, 2020

(30) Foreign Application Priority Data
Sep. 14, 2018 (KR) .................. 10-2018-0109954

(51) Int. Cl.
F16H 1/16 (2006.01)
B62D 5/04 (2006.01)

(52) U.S. Cl.
CPC ............. *F16H 1/16* (2013.01); *B62D 5/0454* (2013.01)

(58) Field of Classification Search
CPC .............................. B62D 55/0454; F16H 1/16
See application file for complete search history.

(56) References Cited

U.S. PATENT DOCUMENTS

| 7,410,028 | B2 * | 8/2008 | Chikaraishi | B62D 5/006 180/402 |
| 7,614,974 | B2 | 11/2009 | Strobel et al. | |
| 10,471,990 | B2 * | 11/2019 | Zuzelski | B62D 5/005 |
| 2017/0363176 | A1 | 12/2017 | Noguchi et al. | |

FOREIGN PATENT DOCUMENTS

| DE | 60319145 T2 | 2/2009 |
| JP | 11-59441 A | 3/1999 |
| JP | 2005-249001 A | 9/2005 |
| JP | 2005-315343 A | 11/2005 |
| JP | 2013-52766 A | 5/2013 |
| JP | 2018-001937 A | 1/2018 |
| KR | 10-2003-0070522 A | 8/2003 |
| KR | 10-1400488 B1 | 5/2014 |
| KR | 20140118169 A * | 10/2014 |
| KR | 10-2015-0012827 A | 2/2015 |

OTHER PUBLICATIONS

German Office Action dated Aug. 19, 2020, in connection with corresponding German Patent Application No. 10 2019 213 987.6.
Korean Office Action dated Sep. 17, 2019, in connection with counterpart Korean Patent Application No. 10-2018-0109954.

* cited by examiner

*Primary Examiner* — Kevin Hurley
(74) *Attorney, Agent, or Firm* — Hauptman Ham, LLP

(57) ABSTRACT

According to electric power steering apparatuses of these embodiments, power of a motor is secondarily reduced and a torque is amplified by connecting a worm wheel and a steering shaft using a cycloid gear, a weight and a cost of the motor can be reduced, and various reduction ratios can be realized, and a secondary deduction structure can be realized while minimizing a change in the structure of an existing reducer.

14 Claims, 10 Drawing Sheets

REDUCER OF ELECTRIC POWER STEERING APPARATUS

CROSS-REFERENCE TO RELATED APPLICATION

This application claims priority from Korean Patent Application No. 10-2018-0109954, filed on Sep. 14, 2018, which is hereby incorporated by reference for all purposes as if fully set forth herein.

BACKGROUND OF THE INVENTION

Field of the Invention

These embodiments relate to a reducer of an electric power steering apparatus and, more particularly, to a reducer of an electric power steering apparatus capable of reducing a weight and a cost of a motor by doubly decelerating and amplifying a torque of the motor in accordance with a reduction ratio between a worm wheel and a steering shaft by coupling the worm wheel and the steering shaft through a cycloid gear structure and capable of realizing various reduction ratio while minimizing a change in an existing reducer structure.

Description of Related Art

A conventional reducer of an electric power steering apparatus has a structure in which a worm shaft having a worm formed on an outer circumferential face thereof, the worm shaft is supported by installing bearings at both ends of the worm shaft, the worm shaft is connected to a motor shaft of the motor through a damping coupler, and the worm shaft is rotated in accordance with driving of the motor.

In the structure, a worm wheel engaged with the worm shaft is mounted on a steering shaft, and a driving force of the motor is transmitted to the steering shaft through the worm shaft and the worm wheel to assist a rotation force according to a driver operating the steering wheel.

At this time, in order to amplify a torque of a motor that drives the worm shaft, the worm shaft and the worm wheel are engaged with each other with a predetermined reduction ratio. As such a reduction ratio increases, the torque of the motor is amplified, and accordingly, required performance can be acquired even in a case in which a motor having a low output is used, whereby a weight and a cost are reduced. However, the radius of the worm wheel becomes large, and there are problems in that it is difficult to install the worm wheel in a vehicle, and abrasion of the worm wheel quickly advances, and the like, and there is a limit on increase in a reduction ratio between the worm shaft and the worm wheel in a conventional reducer structure.

SUMMARY OF THE INVENTION

These embodiments have been proposed on the background described above, and an object thereof is being capable of reducing a weight and a cost of a motor by doubly decelerating and amplifying a torque of the motor in accordance with a reduction ratio between a worm wheel and a steering shaft by coupling the worm wheel and the steering shaft through a cycloid gear structure and capable of realizing various reduction ratio while minimizing a change in an existing reducer structure.

According to these embodiments, an electric power steering apparatus including: a worm wheel that includes a first gear engaged with a worm shaft and a body, in which a first coupling hole into which a steering shaft is inserted is formed, having an outer circumferential face with which the first gear is coupled, the body having one side face in an axial direction formed to be recessed, a protrusion being formed to protrude at a center part of the one side face, and the protrusion through which the first coupling hole passes having an outer circumferential face formed to be eccentric with respect to an inner circumferential face; a first rotor that is formed in a circular shape and is coupled with the outer circumferential face of the protrusion and has an outer circumferential face on which a second gear is formed; a second rotor that has a center part at which a second coupling hole is formed, is coupled with an outer circumferential face of the steering shaft, and rotates with being linked with the first rotor; and a housing in which a plurality of first pins protruding in the axial direction and having ends supported at an outer circumferential face of the second rotor are provided to be disposed in a circumferential direction can be provided According to these embodiments, a weight and a cost of a motor can be reduced by doubly decelerating and amplifying a torque of the motor in accordance with a reduction ratio between a worm wheel and a steering shaft by coupling the worm wheel and the steering shaft through a cycloid gear structure, and various reduction ratios can be realized while minimizing a change in an existing reducer structure.

DETAILED DESCRIPTION OF THE INVENTION

Figure 1:
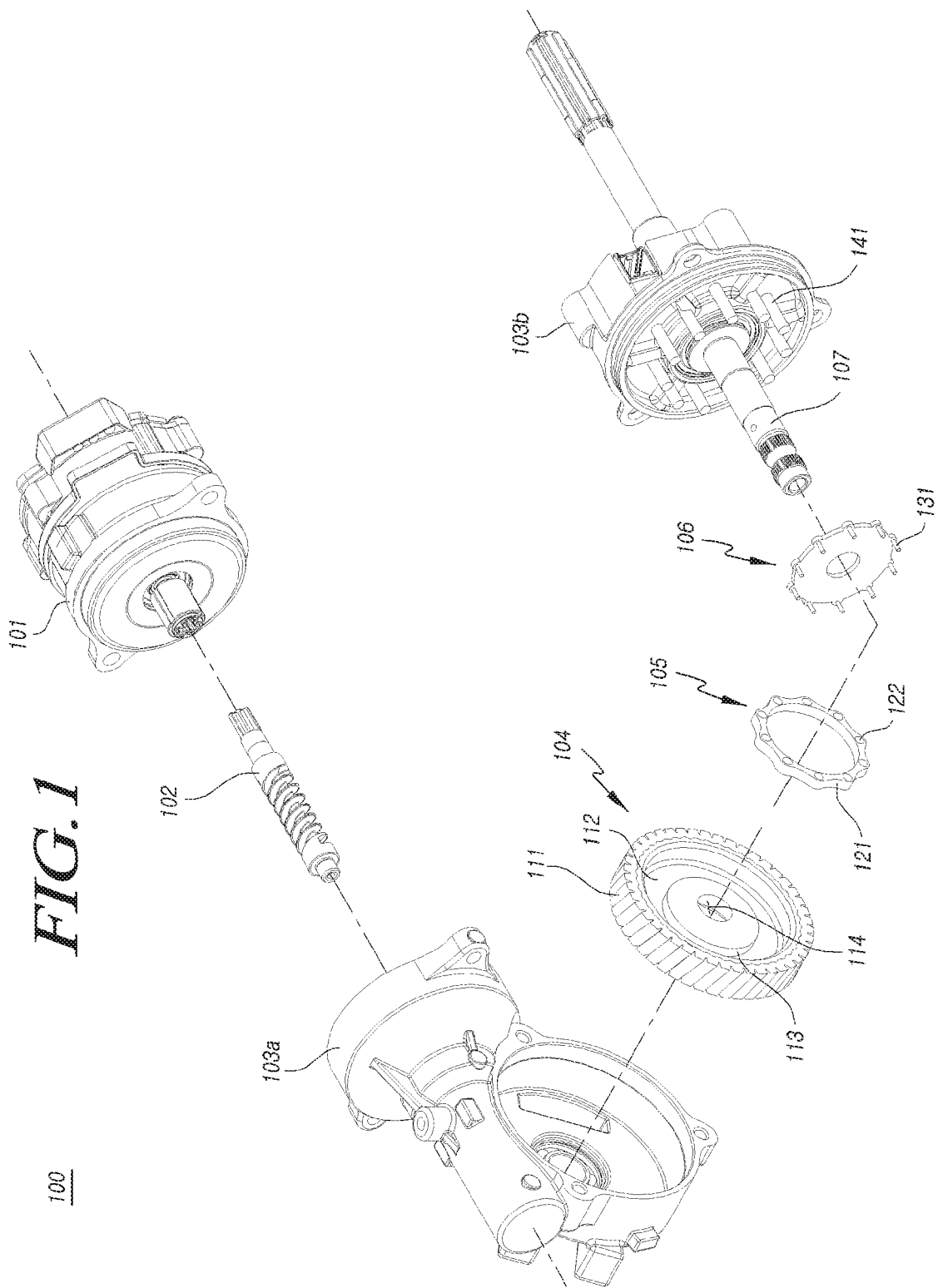
FIG. 1 is an exploded perspective view of a reducer of an electric power steering apparatus according to these embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
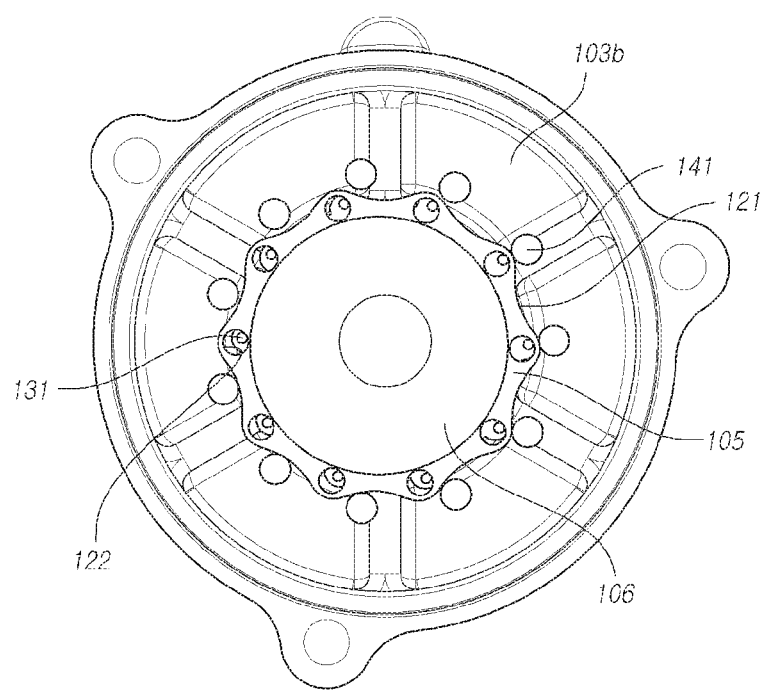
FIGS. 2 and 3 are front views of a part of FIG. 1.
Figure 3:
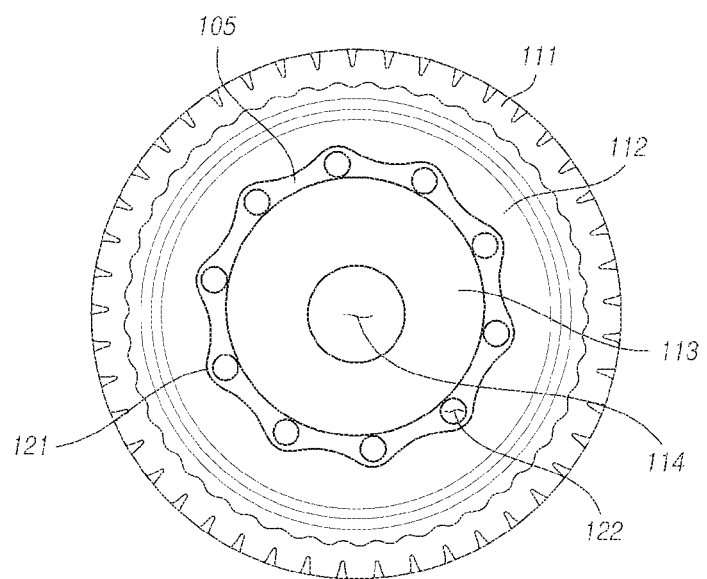
Figure 4:
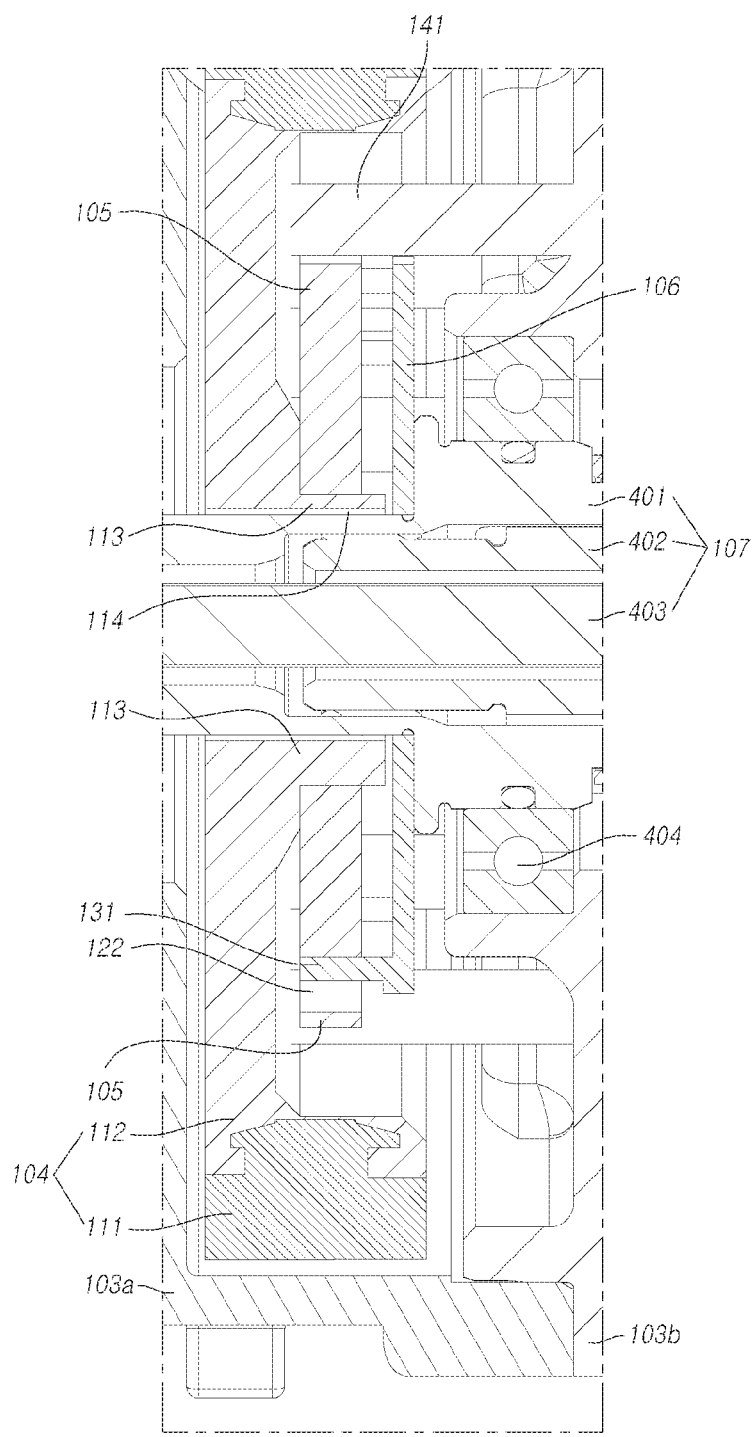
FIG. 4 is a cross-sectional view of an engaged state of FIG. 1.
Figure 5:
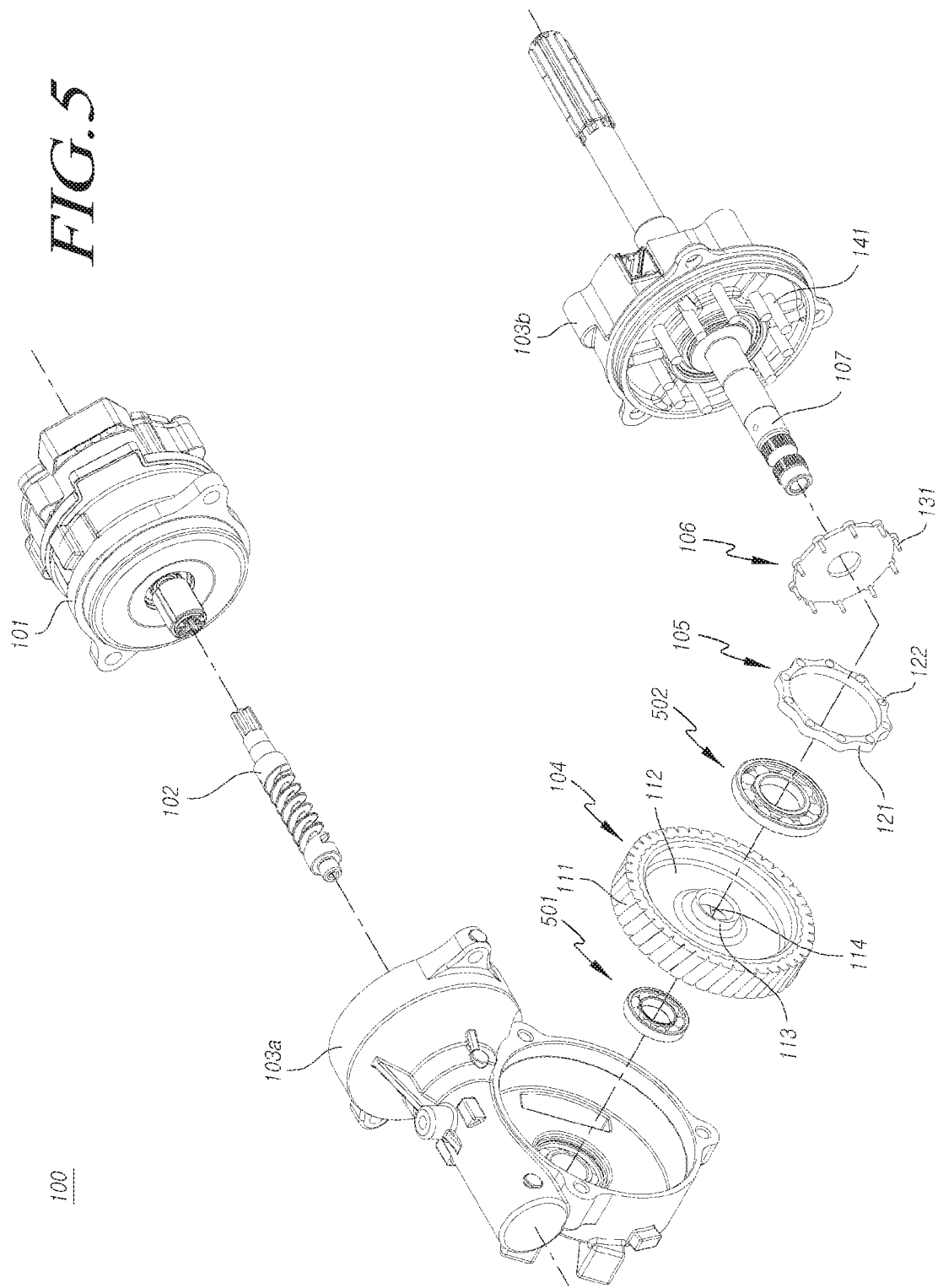
FIG. 5 is an exploded perspective view of a reducer of an electric power steering apparatus according to these embodiments.
Figure 6:
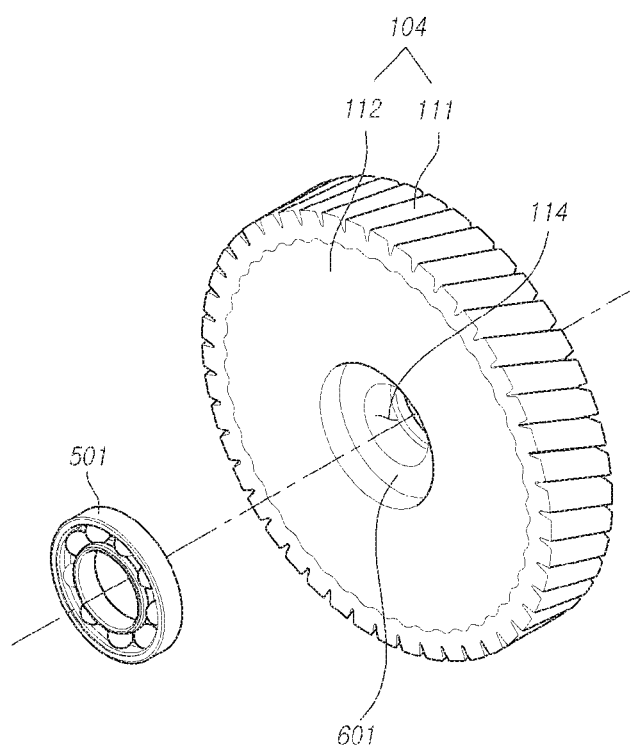
FIGS. 6 and 7 are perspective views of a part of FIG. 5.
Figure 7:
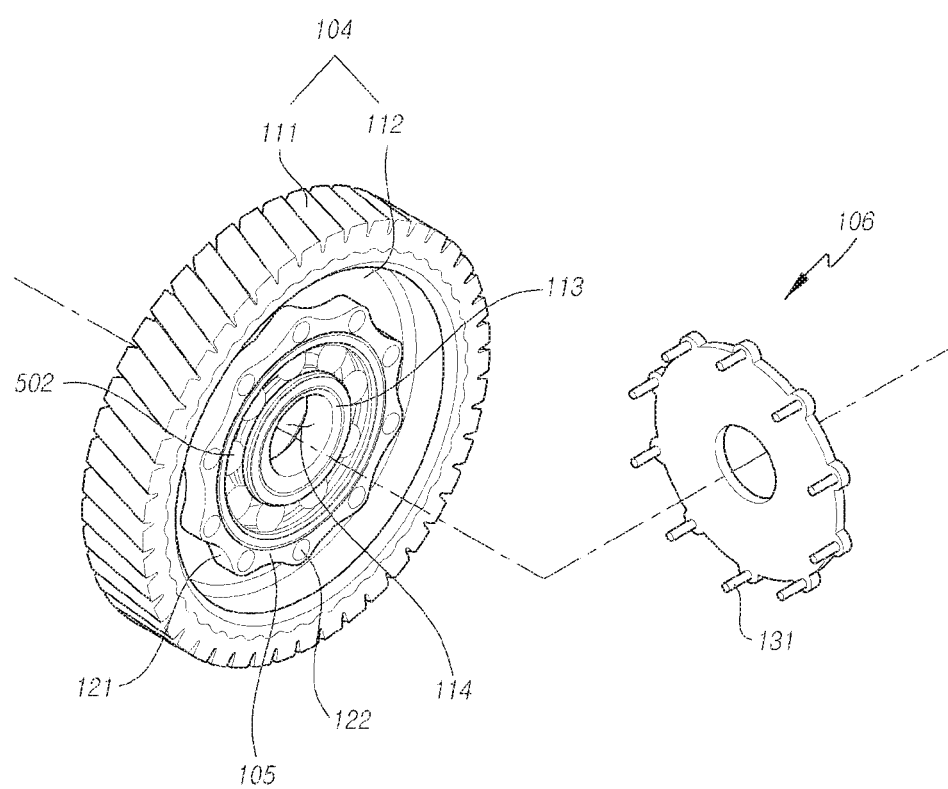
Figure 8:
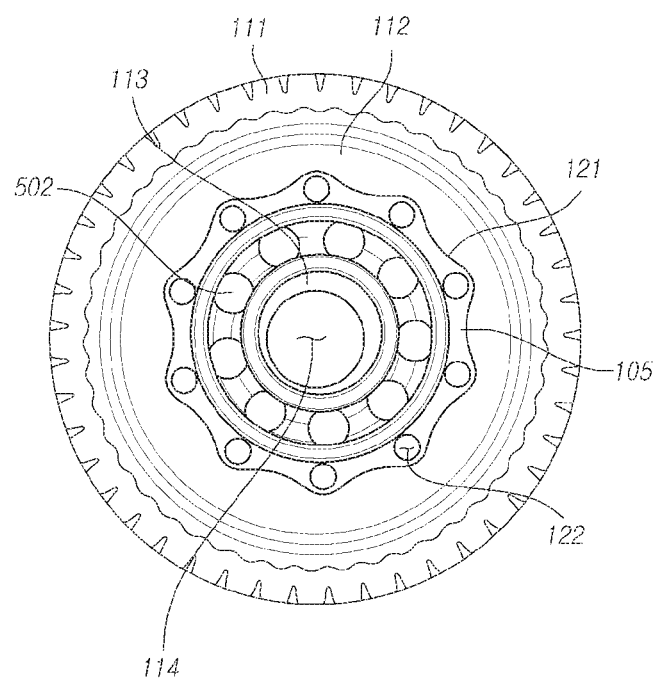
FIGS. 8 and 9 are front views of a part of FIG. 5.
Figure 9:
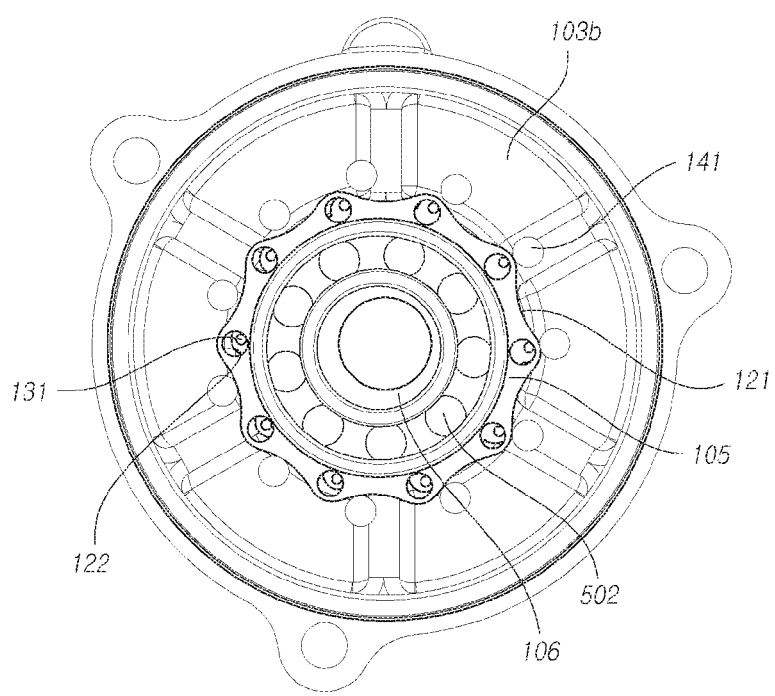
Figure 10:
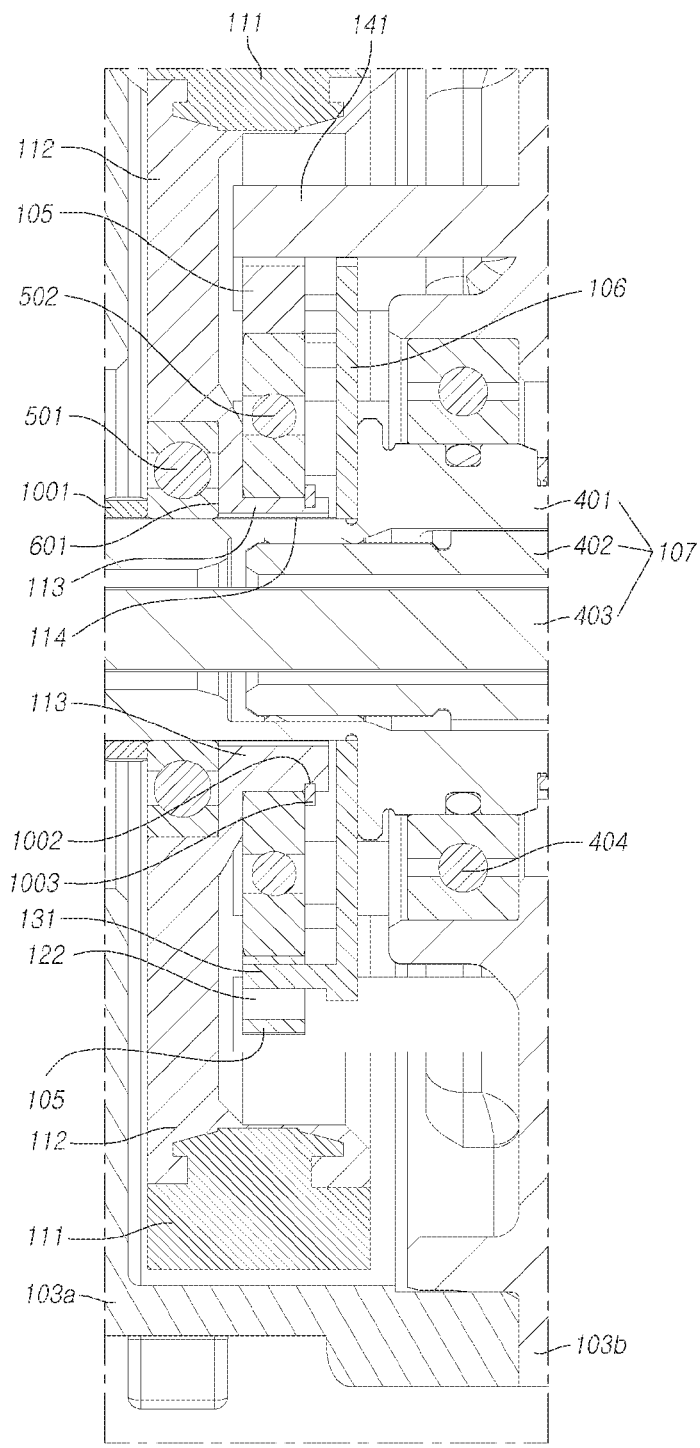
FIG. 10 is a cross-sectional view of an engaged state of FIG. 5.

FIG. 1 is an exploded perspective view of a reducer of an electric power steering apparatus according to these embodiments, FIGS. 2 and 3 are front views of a part of FIG. 1, FIG. 4 is a cross-sectional view of an engaged state of FIG. 1, FIG. 5 is an exploded perspective view of a reducer of an electric power steering apparatus according to these embodiments, FIGS. 6 and 7 are perspective views of a part of FIG. 5, FIGS. 8 and 9 are front views of a part of FIG. 5, and FIG. 10 is a cross-sectional view of an engaged state of FIG. 5.

Referring to these drawing, a reducer 100 of an electric power steering apparatus according to these embodiments includes a worm wheel 104 that includes a first gear 111 engaged with a worm shaft 102 and a body 112, in which a first coupling hole 114 into which a steering shaft 107 is inserted is formed, having an outer circumferential face with which the first gear 111 is coupled, the body 112 having one side face in an axial direction formed to be recessed, a protrusion 113 being formed to protrude at a center part of the one side face, and the protrusion 113 through which the first coupling hole 114 passes having an outer circumferential face formed to be eccentric with respect to an inner circumferential face, a first rotor 105 that is formed in a circular shape and is coupled with the outer circumferential face of the protrusion 113, and has an outer circumferential face on which a second gear 121 is formed, a second rotor 106 that has a center part at which a second coupling hole 132 is formed, is coupled with an outer circumferential face of the steering shaft 107, and rotates with being linked with the first rotor 105, and a housing 103*a*, 103*b* in which a plurality of first pins 141 protruding in an axial direction and having ends supported by an outer circumferential face of the first rotor 105 are provided to be disposed in a circumferential direction.

The worm shaft 102 and the worm wheel 104 are coupled with each other on the inner side of the housing 103*a*, 103*b*, the first gear 111 is engaged with the worm shaft 102, and the worm wheel 104 is rotated by a motor 101.

The worm wheel 104 includes the first gear 111 engaged with the worm shaft 102 and the body 112 having an outer circumferential face with which the first gear 111 is coupled, and the steering shaft 107 is inserted into the first coupling hole 114 formed at the center of the body 112.

The first coupling hole 114 is formed to have a diameter larger than a diameter of the steering shaft 107, the outer circumferential face of the steering shaft 107 and the inner circumferential face of the body 112 are separated away (see FIG. 4), and the worm wheel 104 and the steering shaft 107 are coupled with each other through the first rotor 105 and the second rotor 106.

The steering shaft 107 includes an output shaft 401, a torsion bar 402, and an input shaft 403. The input shaft 403 is coupled with the housing 103*b* through the bearing 404, the output shaft 401 is inserted into the first coupling hole 114, and an outer circumferential face of the output shaft 401 and an inner circumferential face of the body 112 are separated away from each other.

In other words, power of the motor 101 is reduced primarily between the worm shaft 102 and the worm wheel 104 and is reduced secondarily between the worm wheel 104 and the steering shaft 107 in accordance with the first rotor 105 and the second rotor 106, and a torque is amplified.

In addition, the body 112 has one side face recessed in the axial direction, the first rotor 105, the second rotor 106, and the like are provided on one side face that is recessed, and accordingly, a change in a conventional reducer structure is minimized, whereby the reduction ratio can be increased.

Referring to FIG. 2, the protrusion 113 is provided on one side face, which is recessed, of the body 112, the outer circumferential face of the protrusion 113 becomes eccentric with respect to the inner circumferential face, and a center axis of the outer circumferential face is different from a center axis of the first coupling hole 114.

In other words, the first rotor 105 coupled with the outer circumferential face of the protrusion 113 when the worm wheel 104 is rotated by the motor 101 and the worm shaft 102 rotates eccentric with respect to the steering shaft 107.

Referring to FIG. 3, the second gear 121 is formed on the outer circumferential face of the first rotor 105, a plurality of first pins 141 that protrude in the axial direction and has ends supported at the outer circumferential face of the first rotor 105 are disposed in the housing 103*b* in the circumferential direction, and the first rotor 105 rotates inside of a circle formed by the ends of the first pins 141.

The second coupling hole 132 into which the steering shaft 107 is inserted is formed at the center of the second rotor 106, the second rotor 106 rotates integrally with the steering shaft 107, and power of the motor 101 is transmitted to the steering shaft 107 while the first rotor 105 and the second rotor 106 are engaged with each other and rotate.

At this time, the second gear 121 is formed as a cycloid gear, the number of first pins 141 is larger than the number of gear values of the second gear 121. Accordingly, the outer circumferential face of the protrusions 113 and the inner circumferential face of the first rotor 105 slide with respect to each other, and the first rotor 105 rotates with respect to a center axis of the outer circumferential face of the protrusions 113 and revolves around a center axis of the steering shaft 107. At this time, the revolution speed of the first rotor 105 is the same as the rotation speed of the worm wheel 104.

The second rotor 106 includes a second pin 131 formed to protrude in the axial direction, the second rotor 106 includes an insertion hole 122 into which the second pin 131 is inserted, and the first rotor 105 and the second rotor 106 are engaged with each other and rotate.

At this time, the insertion hole 122 is formed to have a diameter larger than a diameter of the second pin 131, the second rotor 106 rotates at the rotation speed of the first rotor 105 when the first rotor 105 rotates and revolves.

Since the second rotor 106 is formed integrally with the steering shaft 107 with being coupled therewith, power of the motor 101 reduces due to a difference between the revolution speed and the rotation speed of the first rotor 105 and a torque is amplified between the worm wheel 104 and the steering shaft 107.

As described above, the number of the first pins 141 is larger than the number of gear values of the second gear 121, and, when the number of the first pins 141 is N1, and the number of gear values of the second gear 121 is N2, a reduction ratio r between the worm wheel 104 and the steering shaft 107 is derived using the following numerical expression.

$$r = \frac{N1 - N2}{N2}$$

In the drawing, an embodiment in which 11 first pins 141 are provided, and the second gear 121 has ten gear values is illustrated. In such a case, power of the motor 101 reduces at the ratio of 10:1 between the worm wheel 104 and the steering shaft 107. Accordingly, for example, reduction occurs at the ratio of 20:1 primarily between the worm shaft 102 and the worm wheel 104, and reduction occurs at the ratio of 10:1 secondarily between the worm wheel 104 and the steering shaft 107. Therefore, the torque of the motor 101 is amplified by 200 times, and a required torque can be acquired even if a motor having a low output is used.

Meanwhile, the insertion hole 122 may be formed to pass through the second rotor 106 in the axial direction, a plurality of second pins 131 and insertion holes 122 are provided along the circumferential direction, and the first rotor 105 and the second rotor 106 can rotate with being stably engaged with each other.

By amplifying the torque of the motor 101, the weight and the size of the motor 101 can be decreased, and the cost can be reduced, and various reduction ratios can be realized in accordance with the secondary reduction structure.

In addition, referring to FIG. 4, as described above, the protrusions 113 are provided on one side face of the worm wheel 104 that is recessed, and accordingly, the first rotor 105, the second rotor 106, and the like are provided on the inner side of the worm wheel 104. Accordingly, the reducer 100 of an electric power steering apparatus according to these embodiments can be realized with a structural change in a conventional reducer minimized.

Meanwhile, referring to FIGS. 5 to 10, the worm wheel 104 and the steering shaft 107 may be coupled with each other through the first bearing 501, and the worm wheel 104 and the first rotor 105 may be coupled with each other through a second bearing 502.

The first bearing 501 is inserted into the first coupling hole 114, and the worm wheel 104 and the steering shaft 107 may be coupled with each other through the first bearing 501.

As described above, the worm wheel 104 and the steering shaft 107 are coupled with each other to have a reduction ratio through the first rotor 105 and the second rotor 106 instead of integrally rotating, the first bearing 501 supports the rotation of the worm wheel 104 between the inner circumferential face of the worm wheel 104 and the outer circumferential face of the steering shaft 107.

In other words, although the first bearing 501 is included in the first coupling hole 114, and thus, the worm wheel 104 is coupled with the steering shaft 107, the steering shaft 107 and the worm wheel 104 rotate with a reduction ratio at different speeds instead of integrally rotating.

A level difference part 601 with which the first bearing 501 is coupled may be provided on the inner circumferential face of the body 112, in other words, the level difference part 601 is formed to extend a diameter on the inner circumferential face of the body 112, and the first bearing 501 is coupled between the outer circumferential face of the steering shaft 107 and the inner circumferential face of the body 112 having the extended diameter and is supported at the level difference part 601 in the axial direction. In addition, a first support member 1001 supported at the first bearing 501 on a side opposite to the level difference part 601 is coupled with the outer circumferential face of the steering shaft 107, and the first bearing 501 may be fixed between the level difference part 601 and the first support member 1001.

As such a coupling member 901, a nut, a snap ring, or the like may be used.

Meanwhile, the second bearing 502 is provided between the outer circumferential face of the protrusions 113 and the inner circumferential face of the first rotor 105, and generation of abrasion, noise, and the like between the protrusions 113 and the first rotor 105 can be prevented.

In other words, as described above, the first rotor 105 is coupled with the outer circumferential face of the protrusions 113 and is supported at the first pin 141, the outer circumferential face of the protrusions 113 and the inner circumferential face of the first rotor 105 slide with respect to each other as the worm wheel 104 rotates, and the first rotor 105 rotates and revolves. The second bearing 502 is provided between the outer circumferential face of the protrusion 113 and the inner circumferential face of the first rotor 105 in which sliding occurs and reduces abrasion and noise.

Similar to the first bearing 501, in order to fix the second bearing 502 in the axial direction, the second support member 903 may be coupled with the protrusion 113.

In other words, the protrusion 113 is formed to be longer than the second bearing 502 in the axial direction, and an end of the protrusion 113 may protrude on the inner side of the second bearing 502.

The second support member 1003 supported at the second bearing 502 is coupled with the end of the protrusion 113 protruding on the inner side of the second bearing 502, and the second bearing 502 is fixed between one side face of the worm wheel 104 and the second support member 1003. In addition, a circumferential groove 1002 is formed to be recessed on the outer circumferential face of the end of the protrusion 113, and the second support member 1003 may be inserted into the circumferential groove 1002.

In other words, although a nut or the like may be used as the second support member 1003, a snap ring may be used for simple coupling. By coupling the snap ring with the circumferential groove 1002, the second bearing 502 may be simply fixed.

According to the reducer of an electric power steering apparatus having such as shape, the worm wheel rotates to have a reduction ratio in accordance with the first rotor and the second rotor instead of rotating integrally with the steering shaft, and accordingly, power of the motor is primarily reduced between the worm shaft and the worm wheel and is reduced secondarily between the worm wheel and the steering shaft, and a high reduction ratio can be acquired. Accordingly, a required output can be acquired even if the capacity of the motor is small, the weight and the size of the motor can be reduced, and the cost can be reduced, and various reduction ratios can be realized in accordance with a secondary reduction structure.

In addition, the protrusion is provided on one side face of the body that is recessed in the axial direction, and the first rotor, the second rotor, and the like are coupled therewith. Accordingly, a thickness of the worm wheel in the axil direction can be more uniformly formed than a worm wheel of a conventional reducer, and therefore, a secondary reduction structure can be realized with a structural change in the conventional reducer minimized.

Furthermore, the first bearing is inserted into the first coupling hole, and the second bearing is provided between the protrusion and the second rotor, whereby abrasion, noise, and the like between the worm wheel and the steering shaft and between the protrusion and the second rotor can be reduced.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims.

The scope of protection of the present disclosure should be construed based on the following claims, and all technical ideas within the scope of equivalents thereof should be construed as being included within the scope of the present disclosure.

REFERENCE SIGNS LIST 100 reducer of electric power steering apparatus
101 motor
102 worm shaft
103a, 103b housing
104 worm wheel
105 first rotor
106 second rotor
107 steering shaft
111 first gear
112 body
113 protrusion
114 coupling hole
121 second gear
122 insertion hole
131 second pin
141 first pin
501 first bearing
502 second bearing
1001 coupling member
1002 circumferential groove
1003 support member

What is claimed is:

1. An electric power steering apparatus comprising:
a worm wheel that includes a first gear engaged with a worm shaft and a body, in which a first coupling hole into which a steering shaft is inserted is formed, having an outer circumferential face with which the first gear is coupled, the body having one side face in an axial direction formed to be recessed, a protrusion being formed to protrude at a center part of the one side face, and the protrusion through which the first coupling hole passes having an outer circumferential face formed to be eccentric with respect to an inner circumferential face;
a first rotor that is formed in a circular shape and is coupled with the outer circumferential face of the protrusion and has an outer circumferential face on which a second gear is formed;
a second rotor that has a center part at which a second coupling hole is formed, is coupled with an outer circumferential face of the steering shaft, and rotates with being linked with the first rotor; and
a housing in which a plurality of first pins protruding in the axial direction and having ends supported at an outer circumferential face of the second rotor are provided to be disposed in a circumferential direction.

2. The electric power steering apparatus according to claim 1, wherein the outer circumferential face of the steering shaft and an inner circumferential face of the body are separated away from each other.

3. The electric power steering apparatus according to claim 1, wherein the second gear is a cycloid gear, and the number of the first pins is larger than the number of gear values of the second gear.

4. The electric power steering apparatus according to claim 1, wherein the second rotor includes a second pin formed to protrude in the axial direction, and the first rotor includes an insertion hole into which the second pin is inserted.

5. The electric power steering apparatus according to claim 4, wherein a diameter of the insertion hole is larger than a diameter of the second pin.

6. The electric power steering apparatus according to claim 4, wherein the insertion hole is formed to pass through the second rotor in the axial direction.

7. The electric power steering apparatus according to claim 4, wherein a plurality of second pins and a plurality of insertion holes are provided and are disposed in the circumferential direction.

8. The electric power steering apparatus according to claim 1, wherein a first bearing is coupled between an inner circumferential face of the body and the outer circumferential face of the steering shaft.

9. The electric power steering apparatus according to claim 8, wherein a level difference part formed to extend a diameter is provided on the inner circumferential face of the body, and the first bearing is placed in the level difference part.

10. The electric power steering apparatus according to claim 9, wherein a first support member supported at the first bearing is coupled with the outer circumferential face of the steering shaft on a side opposite to the level difference part.

11. The electric power steering apparatus according to claim 1, wherein a second bearing is coupled between an inner circumferential face of the first rotor and the outer circumferential face of the protrusion.

12. The electric power steering apparatus according to claim 11, wherein the protrusion is formed to be longer than the second bearing in the axial direction, and an end of the protrusion protrudes on an inner side of the second bearing.

13. The electric power steering apparatus according to claim 12, wherein a second support member supported at the second bearing is coupled with the end of the protrusion.

14. The electric power steering apparatus according to claim 13, wherein a circumferential groove is formed to be recessed on an outer circumferential face of the end of the protrusion, and the second support member is inserted into the circumferential groove.

* * * * *